May 31, 1966  R. A. BERGAN  3,253,341
APPARATUS FOR DETERMINING THE ORIENTATION
OF BOREHOLE INSTRUMENTS
Filed June 18, 1963  2 Sheets-Sheet 1

INVENTOR.
REUBEN ALLARD BERGAN
BY
*Russell E. Schloff*
ATTORNEY

May 31, 1966  R. A. BERGAN  3,253,341
APPARATUS FOR DETERMINING THE ORIENTATION
OF BOREHOLE INSTRUMENTS
Filed June 18, 1963  2 Sheets-Sheet 2

INVENTOR.
REUBEN ALLARD BERGAN
BY
*Russell E. Schloff*
ATTORNEY

3,253,341
APPARATUS FOR DETERMINING THE ORIENTATION OF BOREHOLE INSTRUMENTS
Reuben Allard Bergan, Houston, Tex., assignor to Dresser Industries, Inc., Dallas, Tex., a corporation of Delaware
Filed June 18, 1963, Ser. No. 288,756
7 Claims. (Cl. 33—205)

This invention relates to apparatus for determining the orientation of borehole and borehole instruments and is particularly directed to novel apparatus for determining the orientation of borehole instruments with respect to magnetic north.

In the art of borehole logging, it is frequently desirable to be able to determine the orientation of a borehole instrument which may be several miles below the surface of the earth. To accomplish this, it is customary to provide a subsurface instrument formed of a non-magnetic material and to mount a compass within the instrument to drive a suitable device for establishing an electrical signal indicative of the amount and direction of any variation from magnetic north. This is often attained by connecting the compass to drive a potentiometer so that the magnitude of the electrical signal passed by the potentiometer will indicate the orientation of the instrument. Unfortunately, when the compass is coupled to the potentiometer, movement of the compass causes the wiper of the potentiometer to move over the potentiometer windings and, as there is some friction between the wiper and the windings, this tends to restrict the movement of the compass. At large angles, the torque of the compass is sufficient to overcome this friction. However, as the compass approaches magnetic north, its torque decreases. Thus, at small angles, it is often found that the friction of the potentiometer is greater than the torque of the compass so that the compass never actually reaches the true magnetic north position. It is generally desirable to be able to determine the orientation of the instrument to an accuracy of about plus or minus two degrees. However, the ratio of the potentiometer friction to the compass torque becomes quite large even at angles of about five degrees. Consequently, it has been found necessary to provide some means for overcoming this friction. Numerous systems have been proposed heretofore for accomplishing this. However, none of the prior art systems has been entirely satisfactory. One method proposed has been to change static friction to dynamic friction by means of a vibrator connected to the shaft of the compass. With such method, the compass is rigidly connected to the potentiometer wiper and there is continuous oscillation of the compass card. The oscillation of the shaft and its sliding contact produces excessive wear of the potentiometer, undesirable noise in the system, and is generally inefficient.

These disadvantages of the prior art are overcome with the present invention and novel apparatus is provided whereby the compass controls the movement of the potentiometer but is not rigidly coupled to the wiper. In this way, the friction of the potentiometer may be overcome without interfering with the operation of the compass.

The advantages of the present invention are preferably attained by providing novel apparatus for determining the orientation of a borehole instrument, said apparatus comprising a bowl member, suspension means pivotally supporting said bowl member within said instrument in such a manner that the bowl member will retain a vertical position regardless of the position of said instrument, a relatively massive magnetic compass element mounted in a freely rotatable manner within said bowl member, a generally cylindrical cup having an axially extending slot formed in one side thereof, said cup member being secured for rotation with said compass element, a potentiometer having a wiper which is rotatable to vary the output of said potentiometer, said potentionmeter being rigidly mounted on said bowl member, a shaft secured to said wiper for altering the position of said wiper, said shaft being mounted coaxially with said compass element, a pin extending perpendicularly to said shaft and projecting through said slot in said cup to couple said shaft for rotation by said compass element, and means for applying alternate rotary impulses to said bowl.

Accordingly, it is an object of the present invention to provide improved apparatus for determining the orientation of borehole instruments.

Another object of the present invention is to provide novel apparatus for determining the orientation of borehole instruments employing a compass-driven potentiometer wherein the accuracy of the compass is not hampered by friction due to the potentiometer.

A further object of the present invention is to provide novel apparatus for determining the orientation of borehole instruments employing a compass-driven potentiometer wherein the compass is not rigidly coupled to the potentiometer.

A specific object of the present invention is to provide novel apparatus for determining the orientation of borehole instruments comprising a bowl member, suspension means pivotally supporting said bowl member within said instrument in such a manner that the bowl member will retain a vertical position regardless of the position of said instrument, a relatively massive magnetic compass element mounted in a freely rotatable manner within said bowl member, a generally cylindrical cup having an axially extending slot formed in one side thereof, said cup member being secured for rotation with said compass element, a potentiometer rigidly mounted on said bowl member and having a wiper which is rotatable to vary the output of said potentiometer, a shaft secured to said wiper for altering the position of said wiper, a pin extending perpendicularly to said shaft and projecting through said slot in said cup to couple said shaft for rotation by said compass element, and means for applying alternate rotary impulse to said bowl.

These and other objects and features of the present invention will be apparent from the following detailed description taken with reference to the figures of the accompanying drawings.

Figure 1:
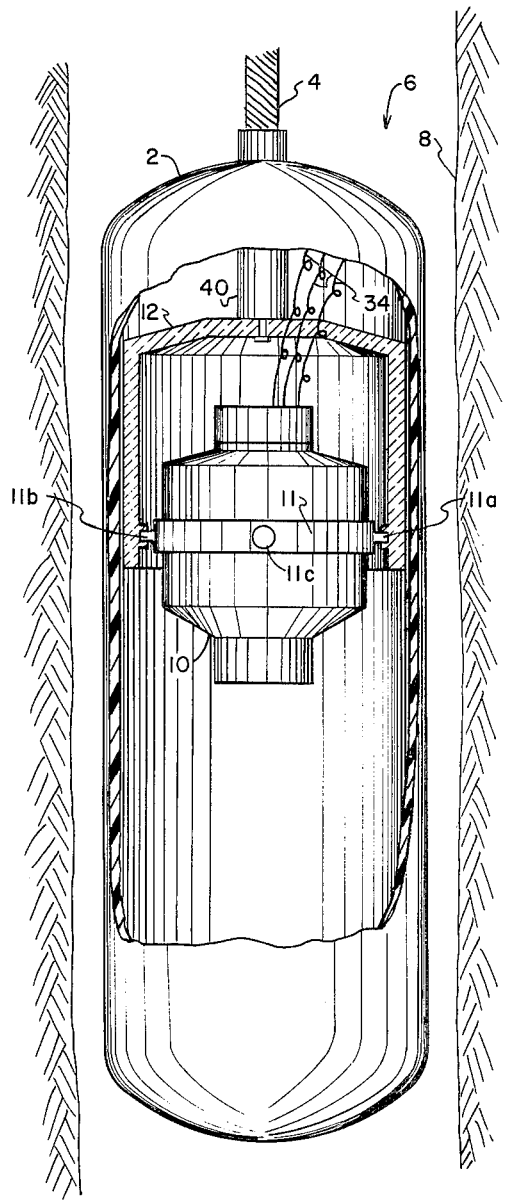
FIGURE 1 is a simplified view, partly in section, of a borehole instrument embodying the present invention suspended in a borehole.

In the form of the present invention chosen for purposes of illustration in the drawings, FIG. 1 shows a borehole instrument 2 suspended by means of a cable 4 in a borehole 6 which penetrates the earth 8. The cable 4 serves to traverse the instrument 2 through the borehole 6 and also provides electrical connections between the instrument 2 and suitable surface equipment, not shown, in a conventional manner. The instrument 2 may be any type of inclination measuring device, such as an inclinometer, or a dip logging instrument. However, the present invention is only concerned with the apparatus for determining the orientation of the instrument and, hence, the other apparatus which would be included within the instrument 2 is immaterial to the present invention and is not shown in the drawing.

As shown in FIGURE 1, the apparatus for determining the orientation of the instrument 2 includes a bell-shaped support 12, and a bowl member 10. The support 12 is pivotally secured on the end of a shaft 40, and includes a gimbal ring 11 pivotally mounted therein at two points 11a and 11b which are 180 degrees apart. The bowl member 10, in turn, is pivotally mounted in the gimbal ring 11 at two points 180 degrees apart from each other, and 90 degrees displaced from points 11a and 11b. FIGURE 1 shows one of such points at 11c, and the other point is concealed behind the bowl member 10. Thus, the bowl member 10 will always assume a vertical position irrespective of the position of either the borehole 6 or the instrument 2.

Figure 2:
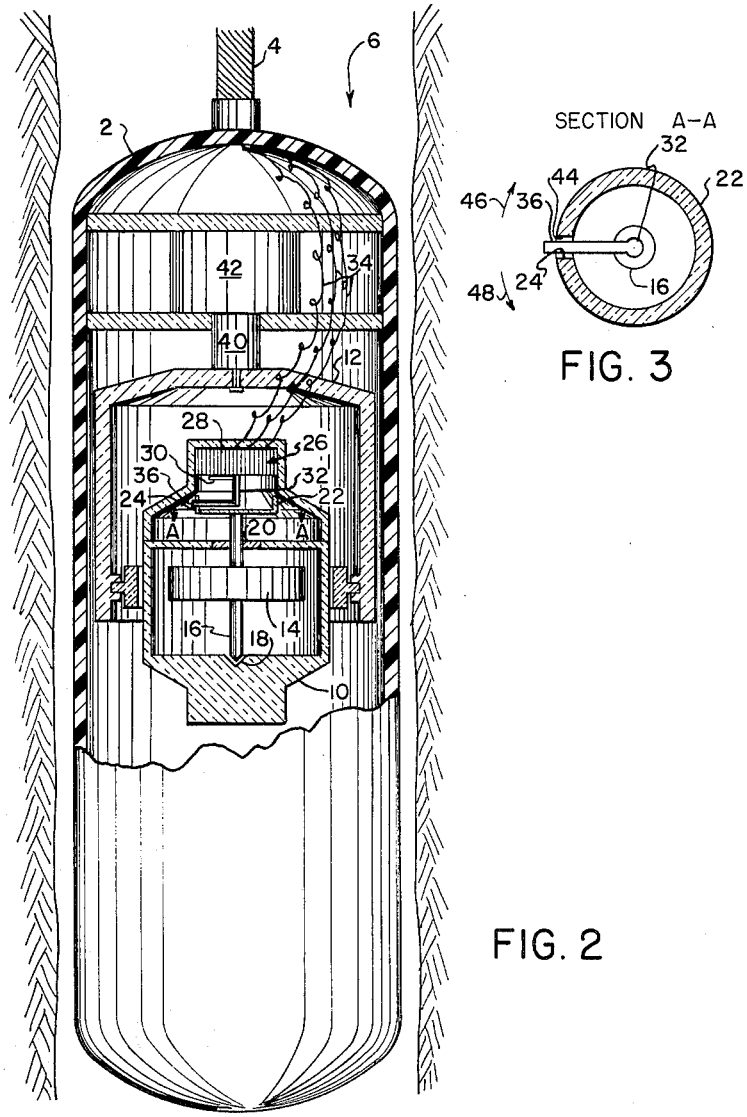
FIGURE 2 is a more detailed view of the apparatus shown in FIGURE 1.

Referring now to FIGURE 2, the bowl member 10 may be seen to contain a relatively massive magnetic compass element 14 which is mounted on a shaft 16 supported by bearings 18 and 20 is is freely rotatable to permit the compass element 14 to constantly seek magnetic north. As shown, the shaft 16 extends through the upper bearing 20 and carries a cup member 22 at the top thereof. The cup member 22 is preferably formed generally cylindrical and has an axially extending slot 24 formed in one side of the cup member 22. A potentiometer 26 is rigidly secured to the bowl member 10 in axial alignment with the shaft 16. The potentiometer 26 comprises a plurality of windings 28 engageable by a wiper 30 which is mounted for rotation by a shaft 32 to alter the resistance provided by the potentiometer 26. Suitable conductors, indicated at 34, serve to electrically connect the potentiometer 26 with appropriate instrumentation in the surface equipment via the cable 4. Shaft 32 is axially aligned with shaft 16 of the compass element 14 and extends to a position within the cup member 22. At the lower end of the shaft 32, a pin 36 is provided which extends perpendicular to the axis of shaft 32 and projects through the slot 24 in the side of the cup member 22. A slight clearance is provided between the pin 36 and the edges of the slot 24 so that the compass element 14 may rotate a slight distance, preferably about 1.5 degrees before one of the edges of slot 24 will engage the pin 36.

FIGURE 2 shows that the shaft 40, which pivotally holds the support 12 at one end, projects in turn from the lower end of an impulse generator 42. The generator 42 serves to apply successive impulses to the shaft 40. The impulses supplied by the generator 42 are alternately positive and negative so as to cause the shaft 40 to rotate slightly clockwise or counter-clockwise each time it receives an impulse from the generator 42. Suitable means, not shown, are provided to restrict the rotation of the shaft 40 to not more than the rotary clearance subsisting between the slot 24 and the pin 36. Thus, the rotation of shaft 40 should be limited to approximately 1.45 degrees, or less, if the width of slot 24 permits the compass element 14 to freely rotate 1.5 degrees, as hereinbefore stated.

In operation, as the instrument 2 is traversed through the borehole, it will constantly be subjected to forces which will divert it from its original orientation. To provide a frame of reference for determining the direction and amount of such diversion, the compass element 14 is provided. The compass element 14 constantly seeks magnetic north and, through the coupling provided by shaft 16, cup 22, pin 36 and shaft 32, will drive the wiper 30 of potentiometer 26 to provide an electrical signal which is transmitted over cable 4 to the surface equipment to indicate the direction and amount of any diversions which occur. Whenever the instrument 2 is subjected to a relatively large diverting action, the compass element 14 will develop considerable torque tending to return it to magnetic north and will drive shaft 32 to adjust the potentiometer 26 to vary the output of the potentiometer 26 and, thereby provide the desired indication. The torque developed by compass element 14 will be especially large because of the relatively large mass of the compass element 14. However, as the compass element 14 approaches the magnetic north position, its torque will approach zero.

Moreover, in instances where the instrument 2 is only slightly diverted, the torque developed by the compass element 14 will be correspondingly slight. In these instances, it will frequently be found that, despite the mass of the compass element 14, the compass element 14 does not develop sufficient torque to overcome the friction which occurs between the wiper 30 and the windings 28 of the potentiometer 26 and, therefore, cannot provide an accurate indication of the diversion of the instrument 2. In some prior art devices, errors of as much as five degrees have occurred. However, these problems are overcome with the present invention.

Figure 3:
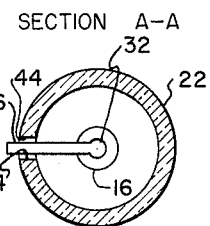
FIGURE 3 is a transverse section through a portion of the apparatus of FIGURE 2 taken on the line A—A thereof.

As described above, the compass element 14 of the present invention is not rigidly coupled to the wiper 30 of the potentiometer 26. Instead, the compass element 14 is coupled to the wiper 30 through shaft 32, pin 36, slot 24 of cup 22 and shaft 16. Moreover, slot 24 provides "play" of about 1.5 degrees with pin 36. Thus, when the torque tending to align the compass element 14 with magnetic north is less than the friction between wiper 30 and the windings 28 of potentiometer 26, the compass element 14 will come to rest several degrees away from true magnetic north with one side of the slot 24 bearing against pin 36, as shown at 44 in FIG. 3. In the meantime, generator 42 is supplying periodic impulses which rotate the bell-shaped support 12 alternately clockwise and counter-clockwise and this rotation is transmitted through bowl member 10 to potentiometer 26. Because of the friction between the windings 28 and the wiper 30 of the potentiometer 26, the rotation will be applied through wiper 30 and shaft 32 to pin 36 and will cause pin 36 to move alternately toward and away from the position of true magnetic north. When the motion of pin 36 is away from the magnetic north position, as indicated by arrow 46, pin 36 will be urged more strongly against edge 44 of slot 24. However, the friction coupling wiper 30 to windings 28 of the potentiometer 26 will be insufficient to overcome the inertia provided by the large mass of compass element 14. Consequently, pin 36 will be displaced slightly toward the magnetic north position. The subsequent rotation of pin 36 will be toward the magnetic north position, as indicated by arrow 48, and will cause pin 36 to move away from edge 44 of slot 24. This leaves compass element 14 free to move and it will move in the direction of arrow 48, due to magnetic attraction, until edge 44 of slot 24 again comes into contact with pin 36. This action will continue in a stepwise manner until the compass element 14 is aligned with the true magnetic north position within the limits defined by the width of slot 24. None of the prior art devices have afforded such accuracy.

It has been found in practice that, aside from diversions caused by hole deviation or obstructions in the borehole 6, the instrument 2 will rotate at a rate which is related to the speed with which the instrument 2 is moved through the borehole 6. Thus, at a logging speed of thirty feet per minute, it will be found that the instrument 2 will rotate at a rate of approximately three degrees per second. Accordingly, the repetition rate of the impulses supplied by the generator 42 should be at least equal to the anticipated rate of instrument 2 rotation and is preferably of a considerably higher frequency. However, the interval between successive impulses from the generator 42 must be long enough to allow for movement of the compass element 14 to its new position. Moreover, it is preferable that the impulses should have a relatively sharp rise and decay, such as a triangular wave, as opposed to a gradual change, such as would be provided by a sine wave.

Obviously, numerous variations and modifications may be made without departing from the present invention. Therefore, it should be clearly understood that the form of the invention described above and shown in the figures of the accompanying drawings are illustrative only and are not intended to limit the scope of the invention. Notwithstanding such variations and modifications, however, the inertia torque of the compass card assembly must be made relatively large, and this is preferably done by means of the use of massive magnet elements. In addition, the coupling between the compass card, and the shaft of the potentiometer, must be made loose and have preferably about 1.5 degrees rotary play relative to each other. Furthermore the impulse generator is adapted to displace the bell-support alternately about the shaft, and in rotational amounts which are preferably at least a little less than that provided for the compass card by means of the aforementioned slot. Thus, when means are provided to produce periodic positive and negative pulsed displacements of the bowl member, and of less than such 1.5 degrees, the compass card assembly will be permitted to seek magnetic north, in a step-wise fashion, without the necessity for oscillation of either the compass card or the potentiometer wiper.

What is claimed is:

1. Apparatus for determining the orientation of a remote unit with respect to magnetic north, said apparatus comprising a bowl member, suspension means pivotally supporting said bowl member within said unit, a relatively massive magnetic compass element mounted in a freely rotatable manner within said bowl member, a potentiometer rigidly secured to said bowl member and having a wiper for altering the output of said potentiometer, coupling means connecting said compass element to said wiper to vary the position of said wiper in response to movement of said compass element with respect to magnetic north, means included in said coupling means for permitting a predetermined amount of play between said compass element and said wiper, and means for applying impulses to said suspension means.

2. Apparatus for determining the orientation of a remote unit with respect to magnetic north, said apparatus comprising a bowl member, suspension means pivotally supporting said bowl member within said unit, a relatively massive magnetic compass element mounted in a freely rotatable manner within said bowl member, a potentiometer rigidly secured to said bowl member and having a wiper for altering the output of said potentiometer, coupling means connecting said compass element to said wiper to vary the position of said wiper in response to movement of said compass element with respect to magnetic north, means included in said coupling means for permitting a predetermined amount of play between said compass element and said wiper, and generator means for suplying alternate clockwise and counterclockwise impulses to said suspension means.

3. Apparatus for determining the orientation of a borehole instrument, said apparatus comprising a bowl member, suspension means pivotally supporting said bowl member within said instrument in a manner such that said bowl member will retain a vertical position regardless of the position of said instrument, a relatively massive magnetic compass element mounted in a freely rotatable manner within said bowl member, a generally cylindrical cup having an axially extending slot formed in one side thereof, means mounting said cup in axial alignment with said compass element for rotation with said compass element, a potentiometer rigidly secured to said bowl member and having a wiper which is movable to vary the output of said potentiometer, a shaft rotatable to alter the position of said wiper, a pin secured to said shaft extending perpendicular to the axis of said shaft and projecting through said slot in said cup member to couple said shaft for rotation by said compass element, said pin having a diameter less than the width of said slot, and means for applying impulses to said suspension means.

4. Apparatus for determining the orientation of a borehole instrument, said apparatus comprising a bowl member, suspension means pivotally supporting said bowl member within said instrument in a manner such that said bowl member will retain a vertical position regardless of the position of said instrument, a relatively massive magnetic compass element mounted in a freely rotatable manner within said bowl member, a generally cylindrical cup having a vertical slot formed in one side thereof, means mounting said cup in axial alignment with said compass element for rotation with said compass element, a potentiometer rigidly secured to said bowl member and having a wiper which is rotatable to vary the output of said potentiometer, a shaft for rotating said wiper, a pin secured to said shaft extending perpendicular to the axis of said shaft and projecting through said slot in said cup to couple said shaft for rotation by said compass element, said slot and said pin being dimensioned to provide a predetermined amount of play between said wiper and said compass element, and means for applying impulses to said suspension means.

5. Apparatus for determining the orientation of a borehole instrument, said apparatus comprising a bowl member, suspension means rotatably mounted within said instrument and pivotally supporting said bowl member in such a manner that said bowl member will retain a vertical position regardless of the position of said instrument, a relatively massive magnetic compass element mounted in a freely rotatable manner within said bowl member, a generally cylindrical cup having a vertical slot formed in one side thereof, means mounting said cup in axial alignment with said compass element for rotation with said compass element, a potentiometer rigidly secured to said bowl member and having a wiper which is rotatable to vary the output of said potentiometer, a shaft for rotating said wiper, a pin secured to said shaft extending perpendicular to the axis of said shaft and projecting through said slot in said cup to couple said shaft for rotation by said compass element, said slot and said pin being dimensioned to provide a predetermined amount of play between said wiper and said compass element, and generator means for supplying successive impulses to said suspension means to rotate said suspension means alternately clockwise and counter-clockwise.

6. Apparatus for determining the orientation of a borehole instrument, said apparatus comprising a bowl member, suspension means rotatably mounted within said instrument and pivotally supporting said bowl member in such a manner that said bowl member will retain a vertical position regardless of the position of said instrument, a relatively massive magnetic compass element mounted in a freely rotatable manner within said bowl member, a generally cylindrical cup having a vertical slot formed in one side thereof, means mounting said cup in axial alignment with said compass element for rotation with said compass element, a potentiometer rigidly secured to said bowl member and having a wiper which is rotatable to vary the output of said potentiometer, a shaft for rotating said wiper, a pin secured to said shaft extending perpendicular to the axis of said shaft and projecting through said slot in said cup to couple said shaft for rotation by said compass element, said slot and said pin being dimensioned to provide a predetermined amount of play between said wiper and said compass element, and generator means for supplying successive impulses of generally triangular wave form to said suspension means to rotate said suspension means alternately in clockwise and counter-clockwise directions.

7. Apparatus for determining the orientation of a borehole instrument, said apparatus comprising a bowl member, suspension means rotatably mounted within said instrument and pivotally supporting said bowl member in such a manner that said bowl member will retain a vertical position regardless of the position of said instrument, a relatively massive magnetic compass element mounted in a freely rotatable manner within said bowl member, a generally cylindrical cup having a vertical slot formed in one side thereof, means mounting said cup in axial alignment with said compass element for rotation with said compass element, a potentiometer rigidly secured to said bowl member and having a wiper which is rotatable to vary the output of said potentiometer, a shaft for rotating said wiper, a pin secured to said shaft extending perpendicular to the axis of said shaft and projecting through said slot in said cup to couple said shaft for rotation by said compass element, said slot and said pin being dimensioned to provide a predetermined amount of limited rotary play between said wiper and said compass element, and generator means for supplying successive impulses of generally triangular wave form to said suspension means to rotate said suspension means alternately in clockwise and counter-clockwise directions to a limited extent less than said predetermined amount of limited rotary play.

No references cited.

ISAAC LISANN, *Primary Examiner.*

W. K. QUARLES, *Assistant Examiner.*